(12) United States Patent
Wessling et al.

(10) Patent No.: US 11,414,976 B2
(45) Date of Patent: Aug. 16, 2022

(54) SYSTEMS AND METHODS TO CONTROL DRILLING OPERATIONS BASED ON FORMATION ORIENTATIONS

(71) Applicants: Stefan Wessling, Lower Saxony (DE); Anne Claudia Maria Bartetzko, Celle (DE); Imed Ben Brahim, Isernhagen (DE); Michael Neubert, Braunschweig (DE)

(72) Inventors: Stefan Wessling, Lower Saxony (DE); Anne Claudia Maria Bartetzko, Celle (DE); Imed Ben Brahim, Isernhagen (DE); Michael Neubert, Braunschweig (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/711,787

(22) Filed: Dec. 12, 2019

(65) Prior Publication Data

US 2020/0190958 A1  Jun. 18, 2020

Related U.S. Application Data

(60) Provisional application No. 62/778,360, filed on Dec. 12, 2018.

(51) Int. Cl.
*E21B 44/02* (2006.01)
*E21B 7/04* (2006.01)
(Continued)

(52) U.S. Cl.
CPC ............... *E21B 44/02* (2013.01); *E21B 7/04* (2013.01); *E21B 44/04* (2013.01); *E21B 45/00* (2013.01);
(Continued)

(58) Field of Classification Search
CPC . E21B 7/04; E21B 44/02; E21B 44/04; E21B 45/00; E21B 49/003; E21B 49/08; G01V 11/00
See application file for complete search history.

(56) References Cited

U.S. PATENT DOCUMENTS 7,483,793 B2  1/2009  Wang et al.
8,576,661 B2  11/2013  Johnson et al.
(Continued)

FOREIGN PATENT DOCUMENTS

WO  017210033 A1  12/2017

OTHER PUBLICATIONS

Hovda et al. "Potential of Ultra High-Speed Drill String Telemetry in Future Improvements of the Drilling Process Control", IADC/SPEC Asia Pacific Drilling Technology Conference and Exhibition, 2008; 11 pages.
(Continued)

*Primary Examiner* — Dany E Akakpo
(74) *Attorney, Agent, or Firm* — Cantor Colburn LLP

(57) ABSTRACT

Systems and methods for controlling subsurface drilling operations are described. The methods include performing the subsurface drilling operation using a bottomhole assembly having a disintegrating device, detecting, with a sensor, a formation layer orientation, approaching, with the disintegrating device, a rock layer, and generating a steering command to change an angle of attack of the disintegrating device relative to the rock layer based on the detected formation layer orientation.

21 Claims, 7 Drawing Sheets

(51) Int. Cl.
*E21B 49/00* (2006.01)
*E21B 44/04* (2006.01)
*E21B 45/00* (2006.01)
*G01V 11/00* (2006.01)
*E21B 49/08* (2006.01)

(52) U.S. Cl.
CPC ............ *E21B 49/003* (2013.01); *E21B 49/08* (2013.01); *G01V 11/00* (2013.01)

(56) References Cited

U.S. PATENT DOCUMENTS

| | | | |
|---|---|---|---|
| 9,004,195 | B2 | 4/2015 | Regener et al. |
| 9,562,983 | B2 | 2/2017 | Hu |
| 9,638,830 | B2 | 5/2017 | Meyer et al. |
| 9,664,011 | B2 | 5/2017 | Kruspe et al. |
| 9,765,609 | B2 | 9/2017 | Chemali et al. |
| 9,870,439 | B2 | 1/2018 | Wu |
| 2010/0300758 | A1 | 12/2010 | Chen |
| 2012/0273270 | A1* | 11/2012 | Rasheed ................ E21B 49/00 175/24 |
| 2013/0140088 | A1* | 6/2013 | Williams ................ E21B 7/06 175/45 |
| 2014/0318866 | A1 | 10/2014 | Lewis et al. |
| 2015/0055438 | A1 | 2/2015 | Yan et al. |
| 2015/0233229 | A1* | 8/2015 | Benson ................ E21B 47/06 700/275 |
| 2015/0377003 | A1* | 12/2015 | Benson ................ E21B 44/00 175/45 |
| 2016/0341834 | A1 | 11/2016 | Bartetzko et al. |
| 2017/0211356 | A1 | 7/2017 | Samuel et al. |
| 2018/0195376 | A1 | 7/2018 | Awadh et al. |
| 2018/0252101 | A1 | 9/2018 | Bartetzko et al. |
| 2019/0048707 | A1* | 2/2019 | Benson ................ E21B 7/24 |
| 2019/0178073 | A1 | 6/2019 | Boone |

OTHER PUBLICATIONS

International Search Report, International Application No. PCT/US2019/065962, dated Apr. 9, 2020, Korean Intellectual Property Office; International Search Report 5 pages.
International Written Opinion, International Application No. PCT/US2019/065962, dated Apr. 9, 2020, Korean Intellectual Property Office; International Written Opinion 6 pages.

* cited by examiner

SYSTEMS AND METHODS TO CONTROL DRILLING OPERATIONS BASED ON FORMATION ORIENTATIONS

CROSS REFERENCE TO RELATED APPLICATIONS

This application claims the benefit of an earlier filing date from U.S. Provisional Application Ser. No. 62/778,360, filed Dec. 12, 2018, the entire disclosure of which is incorporated herein by reference.

BACKGROUND

1. Field of the Invention

The present invention generally relates to subsurface operations and more particularly to controlling drilling operations based on formation orientations.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to energy or a material (e.g., heat, a gas, or fluid) contained in a formation located below the earth's surface. Different types of tools and instruments may be disposed in the boreholes to perform various tasks and measurements.

Changes in rock properties, in particular hardness, such as the Mohs' scale of hardness, Indentation Hardness Index, or L-type Schmidt Hammer, may cause complications with drilling operations (e.g., rates of penetration). In particular, unexpected, thin layers of harder rocks can slow rates of penetration, impact wear on bits, or cause other issues during drilling. Often, these are called "stringers" in the rock description. Stringers are loosely-defined inclusions of material, such as sedimentary material, which is deposited during the sedimentation process with significantly different rock properties compared to the rock material of adjacent sediments. Stringers may also be portions of a sandstone with calcite cement and/or fractures or veins filled with calcite of quartz. Additionally, stringers may be layers with a high content of pebbles, such as (cemented) conglomerates. Thus, as will be appreciated by those of skill in the art, stringers may take many different forms, but are typically a layer that is much harder than adjacent layers. In the present disclosure, the term "stringer" is employed to refer to any hard layer in the formation, for example, any layer with a hardness higher than the layers adjacent to it, independent of its particular nature and origin. For example, the term "stringer" may be employed to refer to any layer with a higher value on the Mohs' scale of hardness, the Indentation Hardness Index, or the L-type Schmidt Hammer, than the layers adjacent to it.

During a drilling operation, contact with the stringers may drastically reduce the rate of penetration (ROP) and cause inappropriate drilling parameters. Such inappropriate drilling parameters (e.g., unfavorable conditions) can deteriorate the bit, reamers, and the performance of a bottomhole assembly. Therefore, knowledge of such stringers and appropriate actions taken in response may be advantageous.

SUMMARY

Disclosed herein are systems and methods for controlling a drilling operation. The systems and methods include performing a drilling operation using a bottomhole assembly having a disintegrating device located at an end of a drill string; monitoring formation layer orientations with one or more sensors located remote from the disintegrating device to obtain formation layer orientation information; monitoring an operational performance of the disintegrating device; detecting a change in drilling operational performance indicative of a formation change; estimating a formation orientation of the formation change based on the formation layer orientation information obtained from at least one of the one or more sensors, offset well data, and historical data; and adjusting a drilling trajectory to set an angle of approach by the disintegrating device to the formation change.

In accordance with some embodiments, the methods and systems can include performing a drilling operation using a bottomhole assembly having a disintegrating device located at an end of a drill string. Detecting and monitoring formation layer orientations with one or more sensors is performed to obtain formation layer orientation information indicative of a formation layer orientation. Monitoring of a drilling operational performance of at least one of the disintegrating device and the bottomhole assembly is performed. A change in the drilling operational performance is detected and adjustment of a steering command is performed to set an angle of attack by the disintegrating device to the formation layer orientation based on the formation layer orientation information.

In accordance with some embodiments, methods for controlling a subsurface drilling operation are provided. The methods include performing the subsurface drilling operation using a bottomhole assembly having a disintegrating device; detecting, with a sensor, a formation layer orientation; approaching, with the disintegrating device, a rock layer; and generating a steering command to change an angle of attack of the disintegrating device relative to the rock layer based on the detected formation layer orientation.

In accordance with some embodiments, systems for controlling subsurface drilling operations are provided. The systems include a bottomhole assembly having a steering unit and a disintegrating device, wherein the disintegrating device is configured to approach a rock layer; one or more sensors configured to detect a formation layer orientation; and a communication device configured to communicate a steering command to the steering unit, the steering command configured to adjust an angle of attack of the disintegrating device relative to the rock layer based on the detected formation layer orientation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
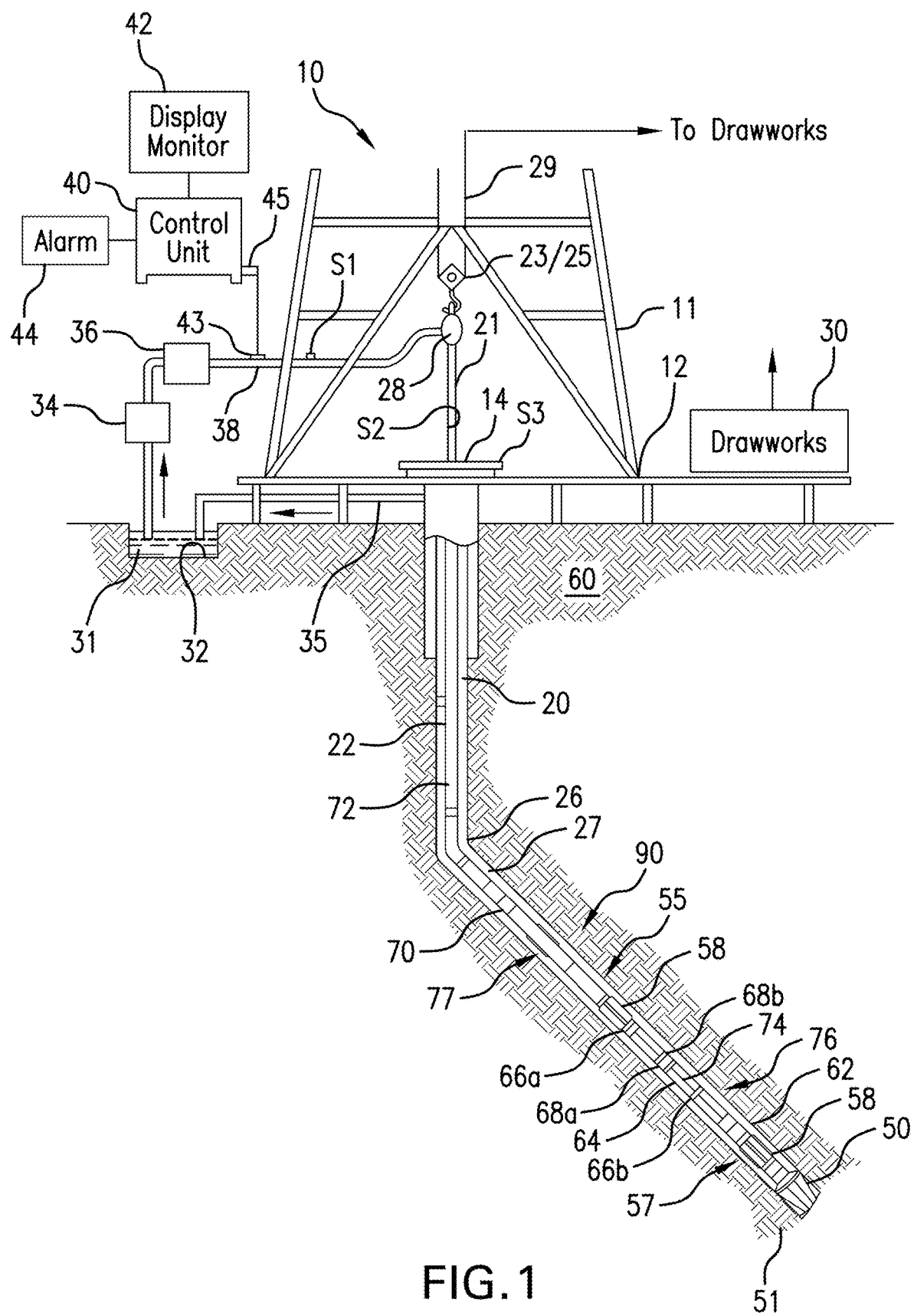
FIG. 1 is an example of a system for performing subsurface operations that can employ embodiments of the present disclosure.

FIG. 1 shows a schematic diagram of a system for performing subsurface operations (e.g., downhole, within the earth or below other surface and into a formation). As shown, the system is a drilling system 10 that includes a drill string 20 having a drilling assembly 90, also referred to as a bottomhole assembly (BHA), conveyed in a borehole or borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drill pipe 22 or drilling tubular extending downward from the rotary table 14 into the borehole 26. A disintegrating device 50, such as a drill bit attached to the end of the drilling assembly 90, disintegrates the geological formations when it is rotated to drill the borehole 26. The drill string 20 is coupled to a drawworks 30 via a kelly joint 21, swivel 28, traveling block 25, and line 29 through a pulley 23. During the drilling operations, the drawworks 30 is operated to control the weight-on-bit (WOB), which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. Fluid line 38 may also be referred to as a mud supply line. The drilling fluid 31 is discharged at the borehole bottom 51 through an opening in the disintegrating device 50. The drilling fluid 31 circulates uphole through the annular space 27 between the drill string 20 and the borehole 26 and returns to the mud pit 32 via a return line 35. A sensor 51 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the drilling assembly 90.

In some applications the disintegrating device 50 is rotated by rotating the drill pipe 22. However, in other applications, a drilling motor 55 (such as a mud motor) disposed in the drilling assembly 90 is used to rotate the disintegrating device 50 and/or to superimpose or supplement the rotation of the drill string 20. In either case, the rate of penetration (ROP) of the disintegrating device 50 into the formation 60 for a given formation and a drilling assembly largely depends upon the weight-on-bit and the rotational speed of the disintegrating device 50. In one aspect of the embodiment of FIG. 1, the drilling motor 55 is coupled to the disintegrating device 50 via a drive shaft (not shown) disposed in a bearing assembly 57. If a mud motor is employed as the drilling motor 55, the mud motor rotates the disintegrating device 50 when the drilling fluid 31 passes through the drilling motor 55 under pressure. The bearing assembly 57 supports the radial and axial forces of the disintegrating device 50, the downthrust of the drilling motor and the reactive upward loading from the applied weight-on-bit. Stabilizers 58 coupled to the bearing assembly 57 and at other suitable locations on the drill string 20 act as centralizers, for example for the lowermost portion of the drilling motor assembly and other such suitable locations.

A surface control unit 40 receives signals from the downhole sensors 70 and devices via a sensor 43 placed in the fluid line 38 as well as from sensors S1, S2, S3, hook load sensors, sensors to determine the height of the traveling block (block height sensors), and any other sensors used in the system and processes such signals according to programmed instructions provided to the surface control unit 40. For example, a surface depth tracking system may be used that utilizes the block height measurement to determine a length of the borehole (also referred to as measured depth of the borehole) or the distance along the borehole from a reference point at the surface to a predefined location on the drill string 20, such as the disintegrating device 50 or any other suitable location on the drill string 20 (also referred to as measured depth of that location, e.g. measured depth of the disintegrating device 50). Determination of measured depth at a specific time may be accomplished by adding the measured block height to the sum of the lengths of all equipment that is already within the borehole at the time of the block-height measurement, such as, but not limited to drill pipes 22, drilling assembly 90, and disintegrating device 50. Depth correction algorithms may be applied to the measured depth to achieve more accurate depth information. Depth correction algorithms, for example, may account for length variations due to pipe stretch or compression due to temperature, weight-on-bit, borehole curvature and direction. By monitoring or repeatedly measuring block height, as well as lengths of equipment that is added to the drill string 20 while drilling deeper into the formation over time, pairs of time and depth information are created that allow estimation of the depth of the borehole 26 or any location on the drill string 20 at any given time during a monitoring period. Interpolation schemes may be used when depth information is required at a time between actual measurements. Such devices and techniques for monitoring depth information by a surface depth tracking system are known in the art and therefore are not described in detail herein.

The surface control unit 40 displays desired drilling parameters and other information on a display/monitor 42 for use by an operator at the rig site to control the drilling operations. The surface control unit 40 contains a computer that may comprise memory for storing data, computer programs, models and algorithms accessible to a processor in the computer, a recorder, such as tape unit, memory unit, etc. for recording data and other peripherals. The surface control unit 40 also may include simulation models for use by the computer to process data according to programmed instructions. The control unit responds to user commands entered through a suitable device, such as a keyboard. The control unit 40 can output certain information through an output device, such as a display, a printer, an acoustic output, etc., as will be appreciated by those of skill in the art. The control unit 40 is adapted to activate alarms 44 when certain unsafe or undesirable operating conditions occur.

The drilling assembly 90 may also contain other sensors and devices or tools for providing a variety of measurements relating to the formation 60 surrounding the borehole 26 and for drilling the borehole 26 along a desired path. Such devices may include a device for measuring formation properties, such as the formation resistivity or the formation gamma ray intensity around the borehole 26, near and/or in front of the disintegrating device 50 and devices for determining the inclination, azimuth and/or position of the drill string. A logging-while-drilling (LWD) device for measuring formation properties, such as a formation resistivity tool 64 or a gamma ray device 76 for measuring the formation gamma ray intensity, made according an embodiment described herein may be coupled to the drill string 20 including the drilling assembly 90 at any suitable location. For example, coupling can be above a lower kick-off sub-assembly 62 for estimating or determining the resistivity of the formation 60 around the drill string 20 including the drilling assembly 90. Another location may be near or in front of the disintegrating device 50, or at other suitable locations.

A directional survey tool 74 that may comprise means to determine the direction of the drilling assembly 90 with respect to a reference direction (e.g., magnetic north, vertical up or down direction, etc.), such as a magnetometer, gravimeter/accelerometer, gyroscope, etc. may be suitably placed for determining the direction of the drilling assembly, such as the inclination, the azimuth, and/or the toolface of the drilling assembly. Any suitable direction survey tool may be utilized. For example, the directional survey tool 74 may utilize a gravimeter, a magnetometer, or a gyroscopic device to determine the drill string direction (e.g., inclination, azimuth, and/or toolface). Such devices are known in the art and therefore are not described in detail herein.

Direction of the drilling assembly may be monitored or repeatedly determined to allow for, in conjunction with depth measurements as described above, the determination of a borehole trajectory in a three-dimensional space. In the above-described example configuration, the drilling motor 55 transfers power to the disintegrating device 50 via a shaft (not shown), such as a hollow shaft, that also enables the drilling fluid 31 to pass from the drilling motor 55 to the disintegrating device 50. In alternative embodiments, one or more of the parts described above may appear in a different order, or may be omitted from the equipment described above.

Still referring to FIG. 1, other LWD devices (generally denoted herein by numeral 77), such as devices for measuring rock properties or fluid properties, such as, but not limited to, porosity, permeability, density, salt saturation, viscosity, permittivity, sound speed, etc. may be placed at suitable locations in the drilling assembly 90 for providing information useful for evaluating the subsurface formations 60 or fluids along borehole 26. Such devices may include, but are not limited to, acoustic tools, nuclear tools, nuclear magnetic resonance tools, permittivity tools, and formation testing and sampling tools.

The above-noted devices may store data to a memory downhole and/or transmit data to a downhole telemetry system 72, which in turn transmits the received data uphole to the surface control unit 40. The downhole telemetry system 72 may also receive signals and data from the surface control unit 40 and may transmit such received signals and data to the appropriate downhole devices. In one aspect, a mud pulse telemetry system may be used to communicate data between the downhole sensors 70 and devices and the surface equipment during drilling operations. A sensor 43 placed in the fluid line 38 may detect the mud pressure variations, such as mud pulses responsive to the data transmitted by the downhole telemetry system 72. Sensor 43 may generate signals (e.g., electrical signals) in response to the mud pressure variations and may transmit such signals via a conductor 45 or wirelessly to the surface control unit 40. In other aspects, any other suitable telemetry system may be used for one-way or two-way data communication between the surface and the drilling assembly 90, including but not limited to, a wireless telemetry system, such as an acoustic telemetry system, an electro-magnetic telemetry system, a wired pipe, or any combination thereof. The data communication system may utilize repeaters in the drill string or the borehole. One or more wired pipes may be made up by joining drill pipe sections, wherein each pipe section includes a data communication link that runs along the pipe. The data connection between the pipe sections may be made by any suitable method, including but not limited to, electrical or optical line connections, including optical, induction, capacitive or resonant coupling methods. A data communication link may also be run along a side of the drill string 20, for example, if coiled tubing is employed.

The drilling system described thus far relates to those drilling systems that utilize a drill pipe to convey the drilling assembly 90 into the borehole 26, wherein the weight-on-bit is controlled from the surface, typically by controlling the operation of the drawworks. However, a large number of the current drilling systems, especially for drilling highly deviated and horizontal boreholes, utilize coiled-tubing for conveying the drilling assembly subsurface. In such application a thruster is sometimes deployed in the drill string to provide the desired force on the disintegrating device 50. Also, when coiled-tubing is utilized, the tubing is not rotated by a rotary table but instead it is injected into the borehole by a suitable injector while a downhole motor, such as drilling motor 55, rotates the disintegrating device 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Liner drilling or casing drilling can be one configuration or operation used for providing a disintegrating device that becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting a liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

One or more sensors of the systems may be configured to sense amplitudes of vibrations or oscillations over time may be disposed on the drill string or the BHA. In one or more embodiments, one or more of the sensors may be disposed near the drill bit or disintegrating device so as to sense vibrations or oscillations at a point of excitation of the drill string. The drill bit may be considered a point of excitation due to interaction of the drill bit with a formation rock as the formation rock is being drilled. Alternatively, or in addition thereto, one or more sensors may be configured to sense torque. Sensed data from the one or more sensors may be transmitted to a surface receiver or a surface computer processing system for processing. Alternatively, or in addition thereto, sensor data may be processed downhole by downhole electronics, which may also provide an interface with a telemetry system.

Although FIG. 1 is shown and described with respect to a drilling operation, those of skill in the art will appreciate that similar configurations, albeit with different components, can be used for performing different subsurface operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired subsurface operation(s).

Disclosed herein are systems and methods for controlling drilling and reaming operations, and particularly to optimize and/or improve efficiencies thereof. More particularly, embodiments disclosed herein are directed to optimization of a drilling operation with respect to and through rock layer, such as a "hard" formation (e.g., a stringer or other formation change). Such drilling operations and methods described herein can include conducting a drilling or reaming operation, monitoring the orientation of formation beds/boundaries using images of a borehole wall or dipmeters, monitoring parameters indicative of the drilling progress, anticipating and detecting a decrease in the drilling progress, defining an attack angle based on the orientation of formation beds, and setting a steering command to drill at the attack angle with respect to a formation layer/bed. Embodiments described herein aid in drilling operations through a formation stringer or hard layer with optimum performance, and at a preferred angle which can minimize dogleg, which in turn reduces the risk in drilling and completion challenges (e.g., stuck pipe and the like).

As described above, stringers or formation changes which create challenges for the drilling operational performance are rock layers comprising hard formation beds which originate from the local deposition (like spills) of sediment material such as calcite or may form from other processes. Stringers are loosely-defined rock layers or inclusions of sedimentary material which is deposited during the sedimentation process with significantly different rock properties compared to the rock material of adjacent sediments. Stringers may comprise portions of a sandstone with calcite cement and/or fractures or veins filled with calcite of quartz. Additionally, stringers may be rock layers with a high content of pebbles, such as (cemented) conglomerates. Thus, as will be appreciated by those of skill in the art, stringers may take many different forms, but are typically a rock layer that is much harder than adjacent layers. In the present disclosure, the term "stringer" is employed to refer to any hard rock layer in the formation, independent of its particular nature and origin.

Stringers and other formation changes are typically aligned parallel to the other formation beds, and thus an extrapolation of the orientation of detected formation layers may be employed to estimate an orientation of a stringer. That is, currently and/or previously drilled through layers may be monitored for orientation relative to the borehole to extrapolate an orientation of a stringer close to the bit or ahead of the bit that may be encountered by the bit while the drilling operation takes place or in the future of the drilling operation, respectively. Embodiments provided herein are directed to a process that uses images of the borehole wall, dipmeter logs, and/or other logs, such as formation evaluation logs, that are indicative of the orientation of formation beds with respect to the borehole axis to adjust an attack angle with respect to a stringer. The detected orientation is employed to drill at and through a stringer at a specific target angle (i.e., attack angle) by either applying a force component normal to the stringer orientation, as soon as the stringer has been detected, or by drilling the optimal stringer attack angle, as soon as the stringer and its orientation can be anticipated.

Stringers and other formation changes are usually detected by measuring drilling operational performance parameters such as weight-on-bit (WOB), torque, rate of penetration (ROP), revolutions per minute (RPM), downhole pressure, drilling vibration, bending moment, etc. Corresponding sensors, such as WOB sensors, torque sensors, ROP sensors, RPM sensors, downhole pressure sensors, drilling vibration sensors, bending moment sensors, etc. (hereinafter referred to as "drilling operation performance sensors"), are well known in the art and will not be discussed further. Drilling operational performance parameters exhibit a drastic change as soon as the bit or other disintegrating device contacts a stringer. Such parameters thus indicate the drilling operation performance.

Typically, an abrupt decrease in ROP is experienced in combination with downhole torque and downhole WOB increases. Further, the bit and the steering unit may begin to slip along the stringer, such that no penetration into or through the stringer is achieved. That is, the bit may "bounce" or "skip" along the surface of the stringer as the drilling operation is not optimized to drill into the harder material of the stringer. The slipping may create well rugosity, tortuosity, and/or high local doglegs of the well trajectory proximate the stringer. Such impacts on the well can have negative impact on the continuation of drilling operations (e.g., high bending moments wear on the BHA components, higher vibrations, etc.) and also on the completion of the borehole after drilling operation is completed. The slipping can be mitigated or even avoided if the bit and steering units are oriented in a preferred attack angle relative to the orientation of the stringer.

In accordance with embodiments of the present disclosure, the orientation of a formation change (e.g., a stringer) relative to the well trajectory can be determined from an image of the borehole wall or a dipmeter. Images of the borehole wall can be used to identify formation or bed boundaries as the formation sensors pass these boundaries. A variety of formation sensors may be used to acquire images of the formation wall, including, but not limited to, acoustic/ultrasonic sensors, resistivity sensors, gamma sensors, density or radiation sensors, etc. These sensors are typically positioned within the BHA behind at least the bit and the steering unit or tool (i.e., remote or a distance from the bit and thus the bottom of the drilled borehole).

Figure 2:
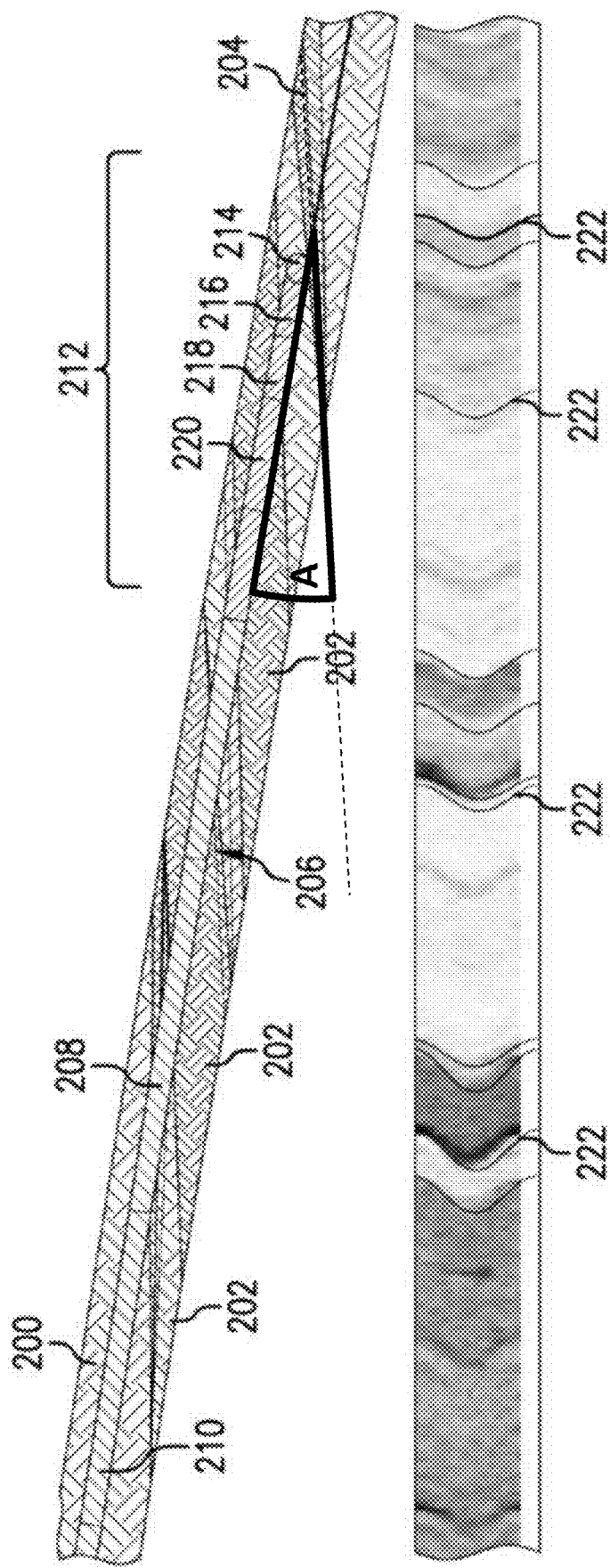
FIG. 2 includes schematic illustrations of a structural Earth model around a well trajectory and a density image of the borehole track.
Figure 3A:
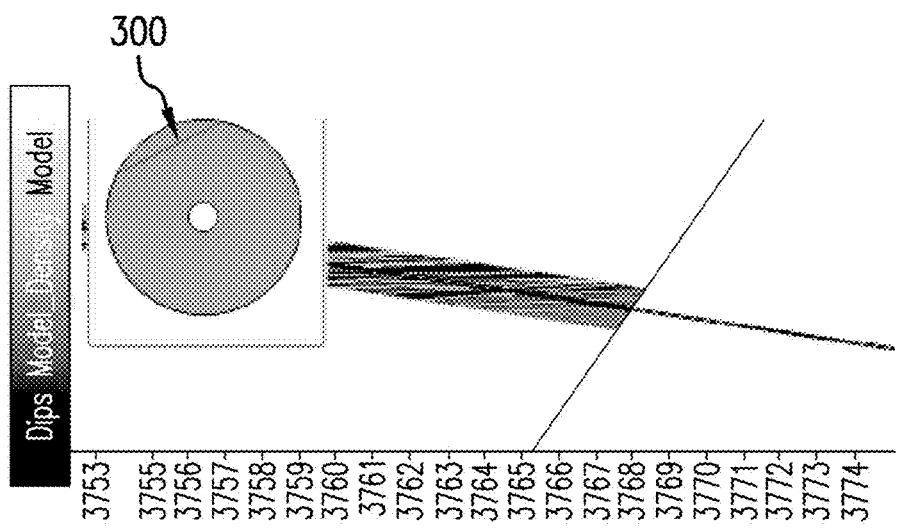
FIGS. 3A-3E are illustrative consecutive measured depth plots as an image sensor passes along a well trajectory.
Figure 3B:
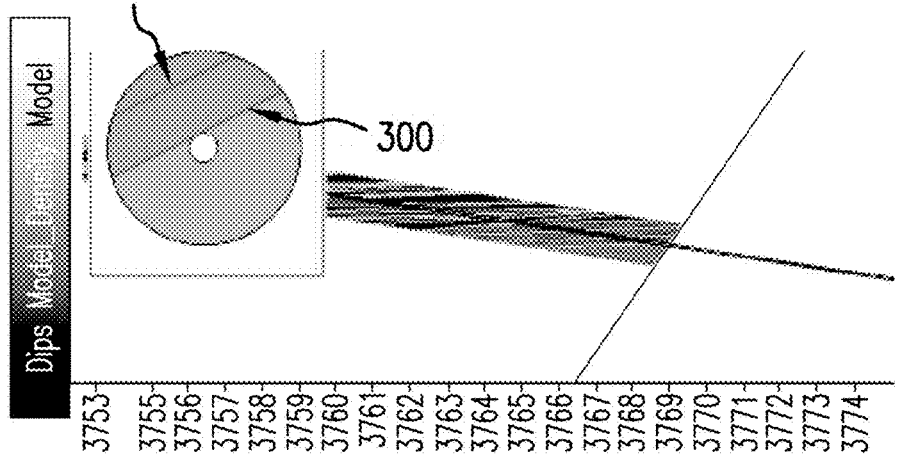
Figure 3C:
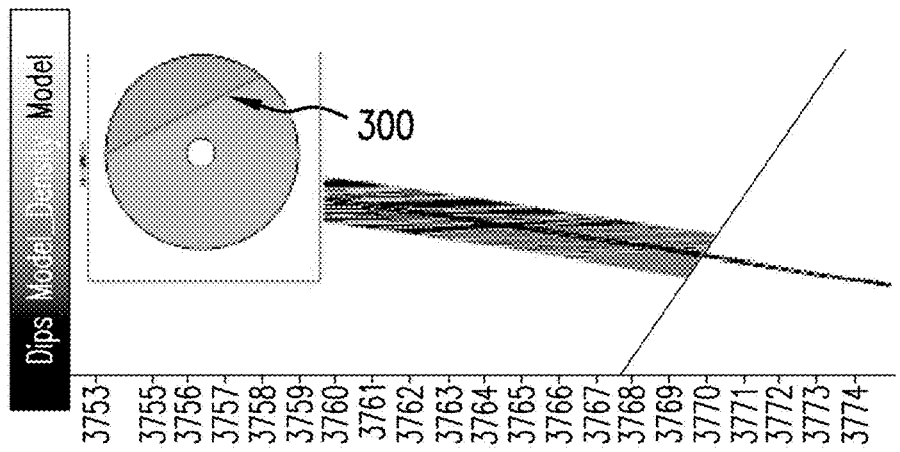
Figure 3D:
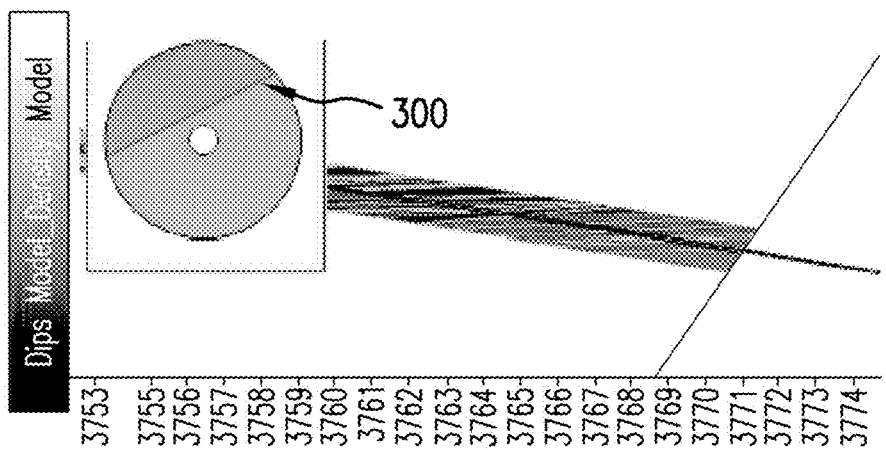
Figure 3E:
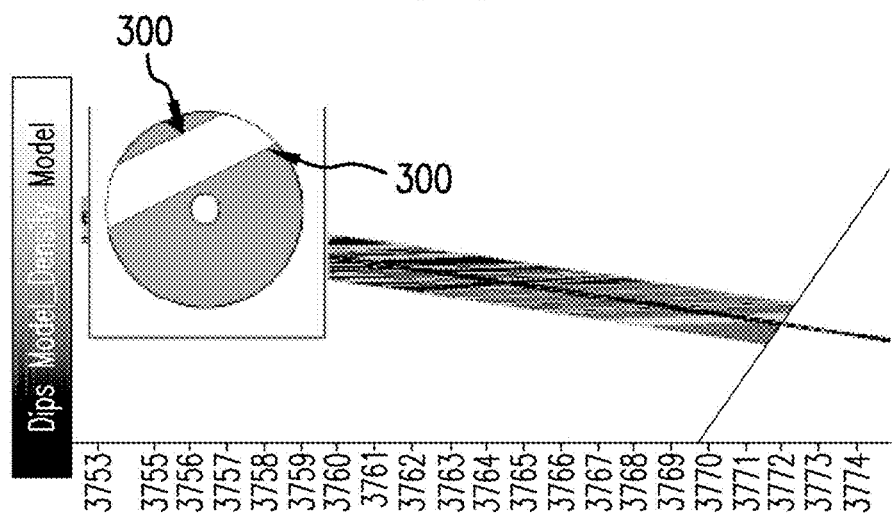

Turning to FIG. 2 an illustrative formation 200 having a plurality of formation layers 202 including a formation change 204 (e.g., a rock layer, such as a stringer) is shown. A borehole 206 is drilled within the formation 200 using a drilling system 208 having a drill string 210 and a bottomhole assembly (BHA) 212. The BHA 212 includes a disintegrating device 214, a steering unit 216, a measurement-while-drilling unit 218, and an imaging unit 220.

In a plane corresponding to the drawing plane of FIG. 2 (plane of projection), which is a plane perpendicular to the formation change 204 and that includes the BHA 212, the BHA 212 and the formation change 204 define an angle which is an angle of attack A with which the BHA 212 enters the formation change 204. The angle of attack A may have significant influence on the capability to enter into and penetrate through the formation change 204. For example, if the formation change 204 includes one or more hard rock layers, it is beneficial for a smooth drilling process if the angle of attack A is large (e.g., larger than 45°, 60°, or 75°). In some situations, it may be beneficial to have the angle of attack A be as large as 85° or larger. If the angle of attack A is relatively low, such as lower than 45°, drilling into and through the formation change 204 may result in undesired wear and/or deviated boreholes caused by entering the formation change 204 at a relatively low angle of attack A.

The top image of FIG. 2 represents a schematic illustration of the formation 200 and the drilling system 208 disposed therein. The lower image of FIG. 2 represents a density image of a borehole track, which has been created by acquiring density properties of the formation azimuthally using the imaging unit 220. The upper image of FIG. 2 represents a structural Earth model around the well trajectory as obtained from the density image of the borehole track.

In logging-while-drilling acquisitions, e.g., using measurement-while-drilling unit 218, the BHA 212 is rotating, so that the data acquisition is continuously conducted while drilling. The collected data, e.g., images, is used to detect and mark formation or bed boundaries 222 shown in the image illustration on the bottom of FIG. 2. The boundaries 222 show up as sinusoidal shapes at density contrasts. The marked formation boundaries 222 may then be used to create the structural Earth model around the well trajectory (upper image in FIG. 2). The Earth model may be color-coded (or otherwise coded) by the average density acquired along the well trajectory. Because stringers and other formation changes typically have a higher density than the surrounding rock, the formation change 204 may be identified through the density imaging.

The continuous acquisition of an image of the borehole wall along the well trajectory can be used to monitor the orientation or change in orientation of formation bed boundaries relative to the drilled well trajectory.

For example, turning to FIGS. 3A-3E, five consecutive images are illustratively shown to illustrate a scenario of consecutive measured depths as an image sensor passes along a well trajectory. The images of FIGS. 3A-3E are representative of images captured from the imaging unit 220 as the borehole 206 is formed. The plots of FIGS. 3A-3E provide a cross-sectional view of the Earth model (e.g., the Earth model shown in the top plot of FIG. 2) perpendicular to the well trajectory. The plots are disc plots that illustrate how formation bed boundaries are represented by the Earth model as the image sensor detects the boundaries of various formation layers. Formation layer orientations 300 are illustratively shown in FIGS. 3A-3E.

With the assumption that at least some consecutive formation boundaries are parallel to each other, the orientation of a formation change (e.g., stringer) relative to the well trajectory may be extrapolated to the bit depth, which provides the expected orientation of a formation boundary at the bit. For example, as shown in FIGS. 3A-3E, the illustrative orientation 300 of the various formation layer boundaries are all substantially similar. As such, due to the extrapolation, even though an orientation of the formation change (at the bit) is not visible to the imaging unit which is remote from the bit, the orientation of the formation change can be extrapolated from the imaged formation boundaries orientations 300 (e.g., previously drilled formations).

Embodiments of the present disclosure are directed to systems and methods for extrapolating the orientation of a formation change and adjusting a drilling operation (e.g., trajectory, angle of attack, etc.) with respect to the formation change. Various functional relationships can be utilized for the extrapolation of the orientation of a formation change. For example, for the extrapolation of the orientation of a formation change from a first location along the drill string (e.g., at a first depth) to a second location along the drill string (e.g., at a second depth, such as the depth of the drill bit), the orientation of a formation change can be assumed to depend on depth in a linear manner (e.g., piecewise linear). Similarly, the orientation of a formation change can be assumed to depend on depth in an exponential manner (e.g., piecewise exponential), polynomial manner (e.g., piecewise polynomial), logarithmic manner (e.g., piecewise logarithmic), or any combination of these.

The formation changes may be identified during a drilling operation, and as the formation change is identified, the extrapolated orientation process may be performed and an updated or adjusted drilling trajectory may be implemented based on the extrapolation. In some embodiments, the entire process may be automated such that monitored drilling characteristics can be used to determine contact with a formation change (e.g., downhole monitoring tools) and upon detection of such criteria, a correction process can be performed to optimize the drilling operation relative to the formation change. For example, a drilling direction can be adjusted such that the bit or other disintegrating device will attack or contact that formation change at an optimized angle to efficiently drill or cut through the formation change. In some embodiments, an automated process may be executed downhole without exchanging information with any surface equipment. For example, an automated process may be executed completely downhole without exchanging information related to the detection of the formation change, the location of the formation change, the orientation of the formation change relative to the borehole (such as the angle of attack), and/or the adjustment of the drilling trajectory (such as steering commands or set points for an automated trajectory control) with any surface equipment.

Different approaches may be applied for the extrapolation of the orientation of formation bed boundaries to estimate the orientation of a formation change. In one embodiment, the orientation of a number of drilled boundaries may be assumed parallel, so that an average orientation may be calculated in case a number of boundaries are not parallel. In another embodiment, a rotation or trend in the orientation of formation boundaries may be encountered for consecutive boundaries, and the trend may be extrapolated to the drill bit depth to predict the orientation of a formation change relative to the well trajectory. In another embodiment, the orientation of the formation boundaries which has been drilled latest (i.e., most recent imaging capture) may be extrapolated to the bit depth and used to predict a formation change orientation.

Figure 4:
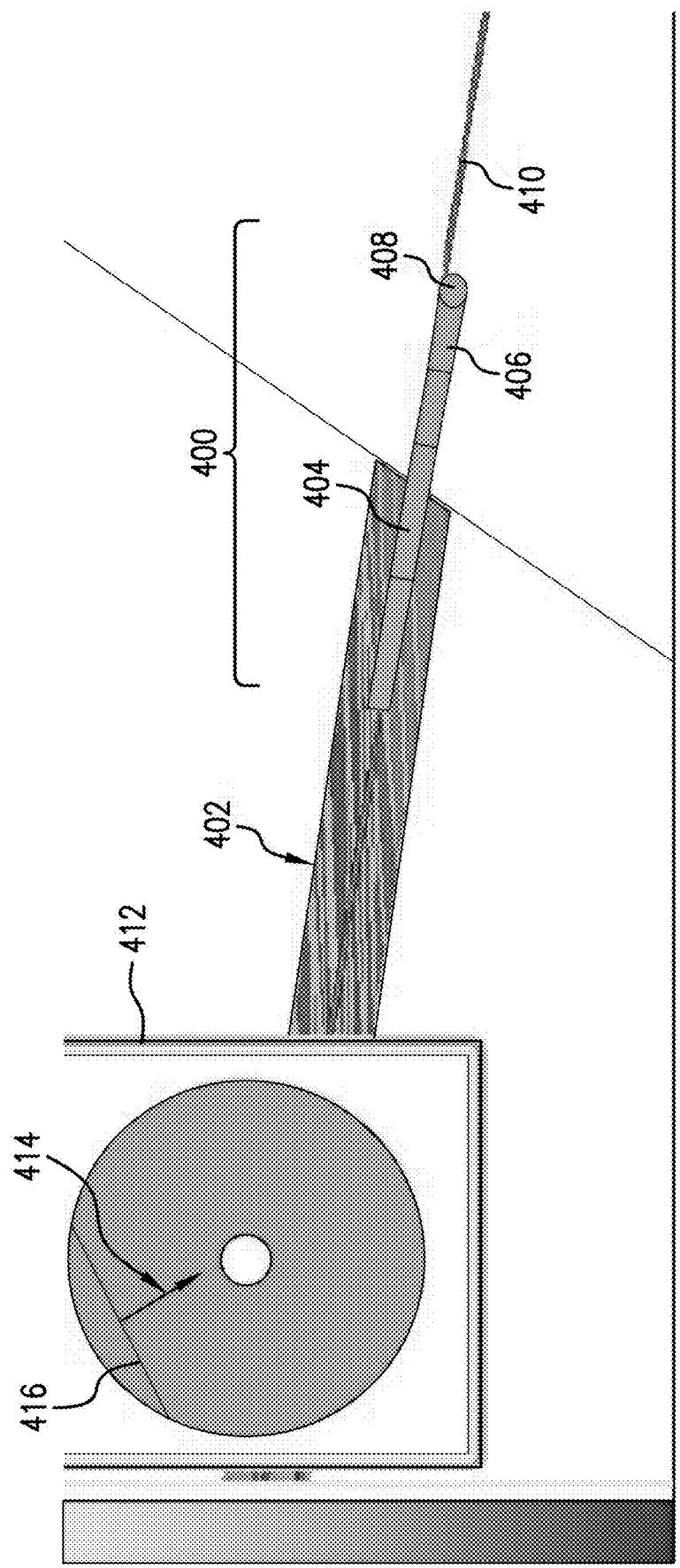
FIG. 4 is an illustrative Earth formation model obtained from a plurality of measurements and/or images in accordance with an embodiment of the present disclosure.

An illustrative embodiment of the present disclosure is shown in FIG. 4. In FIG. 4, a BHA 400 is disposed within a formation 402, the BHA 400 including an imaging unit 404, a steering unit 406, and a disintegrating device 408. The disintegrating device 408 is operated to drilling a borehole through the formation 402, with the steering unit 406 operated to control a drilling direction of the disintegrating device 408. As shown, a drilling trajectory 410 may be representative of a planned drilling operation to form the borehole within the formation 402. The formation 402 illustratively shown in FIG. 4 may be an Earth formation model obtained from a plurality of measurements and/or images, as described above.

As shown, a disc plot 412 is shown which may be captured or obtained by the imaging unit 404. A series of disc plots may be used to generate the Earth formation model. The disc plot 412 illustrates an orientation 414 of a boundary 416. The orientation 414 may be used to determine the application of a steering force, using the steering unit 406, to the BHA 400 in a way that the maximum bit force is oriented perpendicular to the orientation of a formation change, with the formation change orientation being extrapolated from formation bed boundary orientations detected behind the bit using imaging technologies, from offset well measurements, and/or historical data. That is, as described above, the orientation of a formation change may be extrapolated from formation layer boundary orientations that are remote from the drill bit (but previously drilled through) and/or from prior identification of formation changes in a region (e.g., offset well data and/or historical data). Using an offset well and/or historical data can enable the adjustment of the drilling trajectory based on a drilled depth and anticipation of a formation change at such depth.

As will be appreciated by those of skill in the art, a steering force is defined as a vector, and thus setting the steering force includes setting a steering direction. That is, an angle of approach or attack of the disintegrating device toward a formation change (e.g., a stringer) may be set or generated by setting a steering force that is perpendicular to the formation change.

Figure 5:
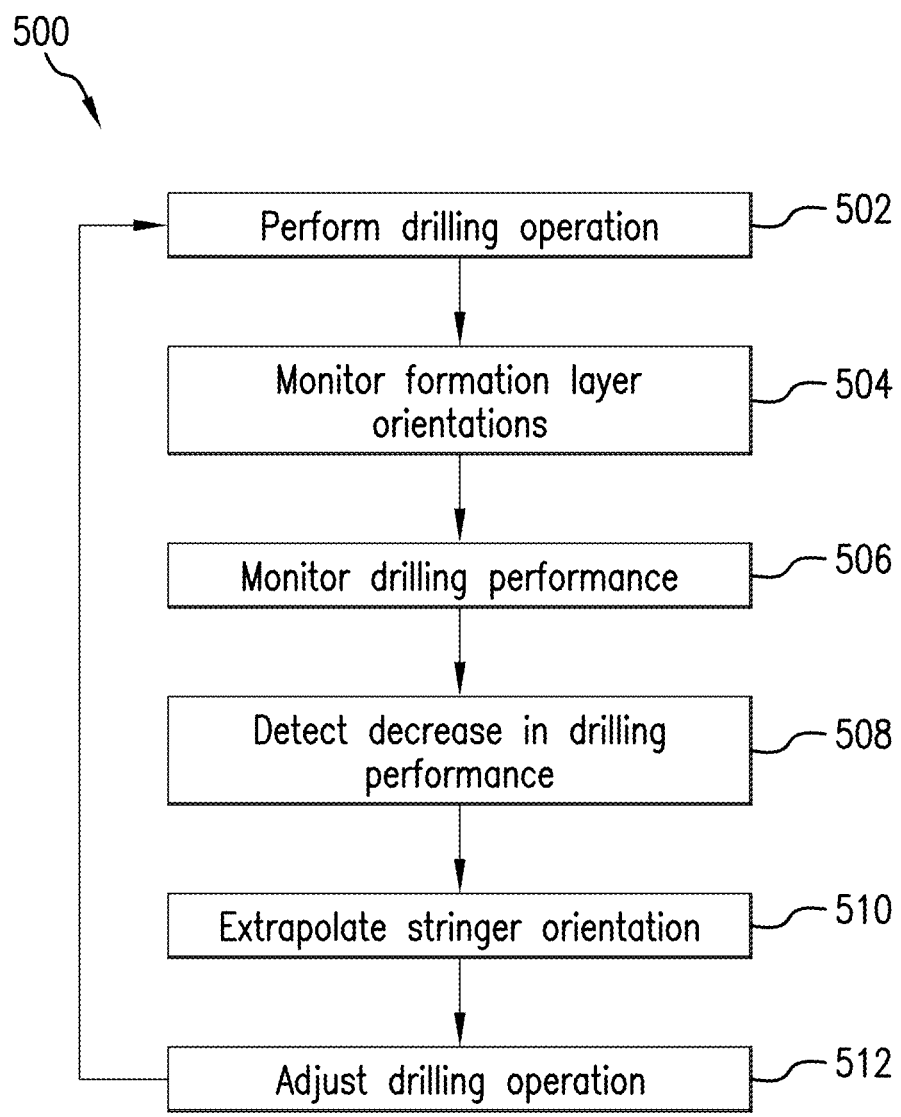
FIG. 5 is a flow process for controlling a drilling operation in accordance with an embodiment of the present disclosure.

Turning now to FIG. 5, a flow process 500 for adjusting a drilling operation based on a formation change (e.g., stringer) in accordance with an embodiment of the present disclosure is shown. The flow process 500, and associated commands, may be applied or executed by a directional driller (e.g., steering unit) of a BHA. The flow process 500 may be performed entirely as an automated process that occurs downhole using downhole electronics, processing equipment, sensors, etc., as will be appreciated by those of skill in the art.

At block 502, a drilling operation is performed wherein a portion of a borehole is drilled using a drill bit or other disintegrating device.

At block 504, during the drilling operation of block 502, an imaging unit of the BHA may be employed to monitor formation layer orientations (e.g., bed orientation). The monitoring process of block 504 may be performed continuously during a drilling operation, with bed formation orientation information stored within a memory of the BHA. The information collected at block 504 may be obtained at a position that is separated from/a distance from the bit or disintegrating device. Thus, the information of block 504 is reflective of formation layers that have already been drilled through by the drill bit or other disintegrating device (at block 502). Various types of monitoring may include, but is not limited to, density measurements, gamma ray interrogation, resistivity measurements, dipmeter, deep shear imaging (e.g., acoustic interrogation), etc.

At block 506, a drilling operational performance may be monitored. To monitor drilling operational performance, one or more drilling characteristics and/or properties may be monitored. For example, in some embodiments, weight-on-bit (WOB), torque, rate of penetration (ROP), and bending moment may be monitored using sensors as known in the art. The drilling properties may be monitored for variations or deviations from an expected value and/or may be monitored to determine if one or more thresholds are passed (i.e., either greater than or less than a set threshold or criteria, depending on specific drilling property being monitored).

At block 508, a decrease in drilling operational performance may be detected. The decrease in performance may be detected through the monitoring performed at block 506. That is, when a specific threshold or criteria is passed (greater than or less than a predetermined value), such crossing of the threshold may be indicative of a decrease in drilling operational performance. For example, a reduced rate of penetration may indicate a reduction in drilling operational performance. However, in some instances an increased rate of penetration may be indicative of a decrease in drilling operational performance. Thus, in some embodiments, a plurality of different drilling properties or characteristics may be monitored to enable a more accurate determination of a reduction in drilling operational performance. Reduce drilling operational performance may be the result of interaction with a formation change (e.g., stringer or other hard material/formation). Alternative, the reduction in drilling operational performance may be the results in rapid or repeated changes in formation layer hardness (e.g., hard layer, soft layer, hard layer, etc., in series).

At block 510, when the drilling operational performance is determined to have decreased, an extrapolation of formation layer orientations may be performed, with an extrapolated formation change orientation being determined. The extrapolation may be based on the information obtained at block 504. The extrapolation may be based on an assumption that all formation layers are parallel, thus extrapolating that the formation change is oriented at the same angle as all other layers that have preceded the formation change during the drilling process. However, in some embodiments, the angle or orientation of a series of formation layers may be different as depth increases. For example, in some situations, a formation may have increasing angle of orientation layers. The progressive change in orientation may be extrapolated from the information obtained at block 504.

The extrapolation performed at block 510 is made with respect to the currently drilled well trajectory. That is the orientation of the formation change is extrapolated with respect to the borehole trajectory. Accordingly, at block 510, an orientation or angle of a formation change relative to the current drilling trajectory may be estimated.

At block 512, based on the extrapolated formation change orientation from block 510, a steering command may be set and communicated to the steering unit by a communication device, or other adjustment to a drilling trajectory or operation may be performed. Because formation changes (e.g., stringers) are typically a hard material, the most efficient drilling direction is one that is perpendicular to the formation change orientation. That is, an attack angle of 90° is preferred for an efficient drilling through the formation change. However, a perpendicular attack angle may not always be possible, and thus the adjustment to the drilling trajectory may be to achieve the greatest possible angle in the most efficient manner. The adjustment at block 512 may require the BHA to be moved upward or backward along the borehole such that the angle of attack relative to a formation change may be adjusted.

After adjustment, the drilling process may be continued at the new drilling trajectory to drill through the formation change. After completion of drilling through the formation change, the drilling trajectory may be reset back to the original trajectory to adhere to a pre-set drilling plan. The flow process 500 is continuously performed such that any formation change may be accounted for and efficient drilling operations may be achieved.

Figure 6:
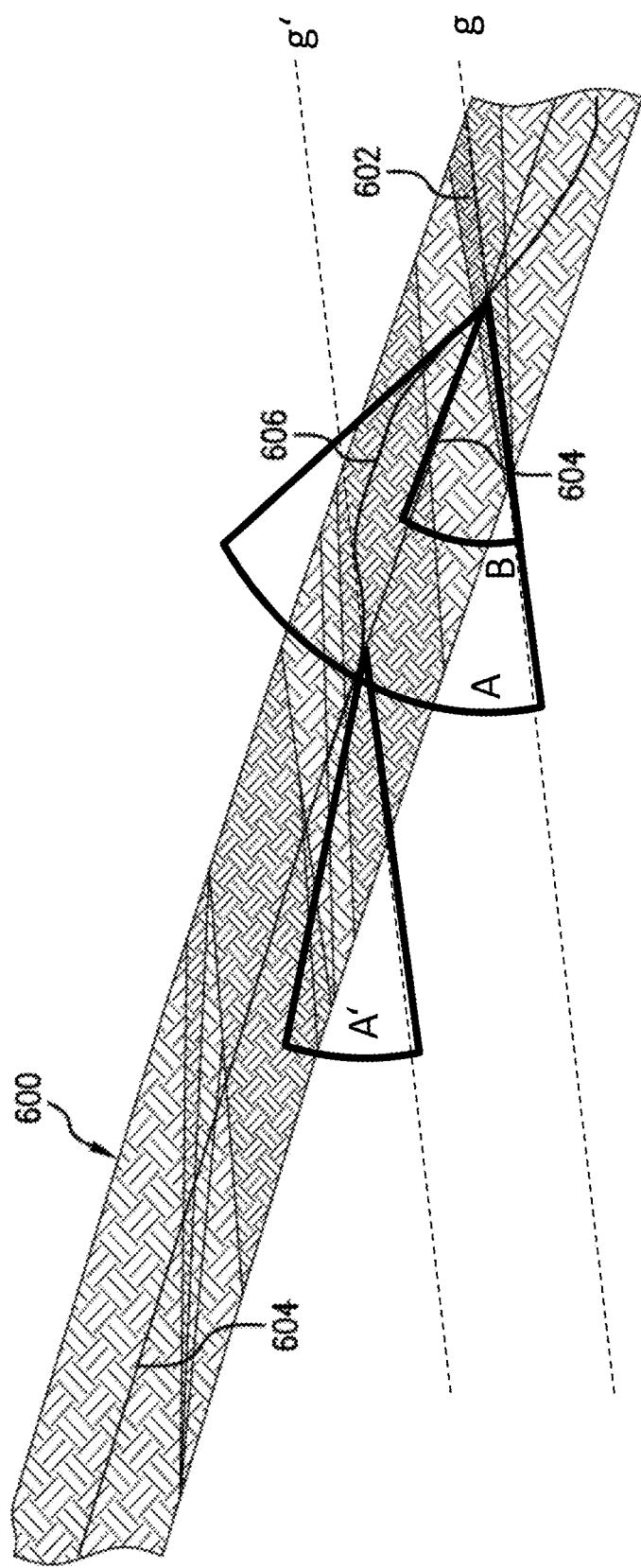
FIG. 6 is a schematic illustration of an adjusted drilling trajectory as achieved in accordance with an embodiment of the present disclosure.

Turning now to FIG. 6, a schematic illustration of a drilling operation employing an embodiment of the present disclosure is shown. As shown, a formation 600 includes a formation change 602 (e.g., a rock layer, such as a stringer) as a formation layer therein. A planned drilling trajectory 604 is shown as a substantially straight path through the formation 600 and having a planned angle of attack B to the formation change 602 (represented by line g). However, when the flow process described above is performed, and it is determined that the formation change 602 is being approached (or attempted to be drilled into), an adjusted drilling trajectory 606 may be set to enable an updated (e.g., optimized or improved) angle of attack A relative to the formation change 602.

For example, with reference to FIG. 6, the updated angle of attack A may be larger than the planned angle of attack B. To achieve the larger angle of attack A at the location when the drill bit enters the formation change 602, it may be beneficial to decrease an angle of attack first before the drill bit enters the formation (indicated by reduced angle A' of adjusted drilling trajectory 606 relative to line g' parallel to line g). The adjusted drilling trajectory 606 will then run in parallel to the planned drilling trajectory 604 for some distance to enable a penetration into formation change 602 at the updated (higher) angle of attack A. In one such example, when the drill bit contacts the formation change 602 at the location where line g crosses the planned drilling trajectory 604, the drill bit can be pulled back within the borehole by some distance to the location where line g' crosses the planned drilling trajectory 604. At the location where line g' crosses the planned drilling trajectory 604, a sidetrack can then be drilled with the reduced angle of attack A', a section where the adjusted drilling trajectory 606 runs in parallel to the planned drilling trajectory 604, and where the formation change 602 is then entered with the updated (increased) angle of attack A relative to the planned angle of attack B.

Although described above as a specific imaging or monitoring of formation layer orientations, various mechanisms for monitoring formation orientation may be employed without departing from the scope of the present disclosure. For example, in some embodiments, rather than imaging the Earth formation itself, a monitoring device may image the borehole wall. Data collected with the borehole wall may be interpreted automatically in order to detect formation bed boundaries. The automatic interpretation may provide the existence and orientation of the boundaries, so that the steering command can be immediately applied as soon as a formation change is detected by measurements-while-drilling sensors.

In one embodiment, the steering command or adjustment to the drilling trajectory may be transmitted by a communication device via a downlink to the BHA from the surface. The command can ensure that the steering unit steers in an optimum angle against the formation change. Further, as noted above, the flow process of FIG. 5 may be implemented in the technologies of the BHA, so that the detection of formation changes, monitoring of formation bed boundary orientation, and setting of steering commands can be conducted automatically as a downhole process with no interaction or delay associated with communication with the surface.

In another embodiment, the existence, location, and orientation of formation changes for a planned well trajectory may be correlated from nearby offset wells where formation changes were already detected and drilled. The expected formation change location and orientation from offset wells may be used either for updating the well plan in order to anticipate the formation change and plan for an optimal attack angle or for the steering command as soon as a formation change is hit while drilling the planned well trajectory or while geosteering. In some embodiments, the expected formation change location and orientation may be updated using imaging sensors within the BHA. An update of the location and orientation of formation changes may then be used as the basis for steering commands and/or adjustment to the drilling trajectory.

As described herein, embodiments of the present disclosure are directed to optimizing a drilling trajectory relative to a "hard" formation (e.g., a stringer) which may require a more direct contact with a drilling bit, as compared to "soft" formations that are not as difficult to drill through. As discussed above, "hard" formations can be either thick layers or beds of hard material or composition or thin intercalations within a soft formation, and as used herein have been referred to generically as a "stringer." To optimize drilling operations, particularly with respect to formation changes (e.g., stringers), imaging of formation layers are taken (using one or more techniques for monitoring layer orientation), and the measured orientations are extrapolated to estimate the orientation of a formation change.

The drilling trajectory can be adjusted to have the drill string and drill bit approach/contact the formation change at about a 90° angle (or at relatively steep angle of approach, e.g., greater than 50°), thus maximizing drilling ROP and drilling efficiency through the formation change. In operation, formation layer orientation data is collected (e.g., imaged) and from such data, the formation orientation can be understood. From the formation orientation, the orientation of the formation change can be extrapolated or predicted. Based on the predicted formation change orientation, the drilling trajectory is adjusted to optimize drilling efficiency.

As discussed herein, in some embodiments, the entire process may be performed downhole, in real-time, and automatically. In some embodiments, based on prior-knowledge from companion/offset wells, and imaging in real-time, detection of orientations and adjusting of the drilling trajectory may be achieved. In embodiments having a single well, if a formation change is detected by monitoring drilling parameters, the drill string can be pulled back (e.g., away from the formation change) and the drilling trajectory may be adjusted based on the imaging and extrapolation of the orientation of the formation change.

Advantageously, some embodiments provided are directed to automation of drilling trajectory based on determination of an orientation of a formation change (e.g., stringer). The formation change orientation may be obtained from extrapolation of formation orientations that are remote from the bit.

Further, the systems may automatically adjust a drilling trajectory and/or steering parameters (e.g. steering direction and steering force) based on the determined or extrapolated orientation of the formation change.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1

A method for controlling a drilling operation comprising: performing a drilling operation using a bottomhole assembly having a disintegrating device located at an end of a drill string; detecting and monitoring formation layer orientations with one or more sensors to obtain formation layer orientation information indicative of a formation layer orientation; monitoring a drilling operational performance of at least one of the disintegrating device and the bottomhole assembly; detecting a change in the drilling operational performance; and adjusting a steering command to set an angle of attack by the disintegrating device to the formation layer orientation based on the formation layer orientation information.

Embodiment 2

The method of any prior embodiment, wherein the drilling operational performance comprises at least one of rate of penetration, revolutions per minute, downhole pressure, drilling vibration, torque, weight-on-bit, and bending moment.

Embodiment 3

The method of any prior embodiment, wherein the one or more sensors for detecting formation layer orientations comprise one or more of acoustic sensors, ultrasonic sensors, resistivity sensors, gamma ray sensors, density sensors, radiation sensors, or dipmeters.

Embodiment 4

The method of any prior embodiment, wherein the steering command is adjusted to have an angle of attack of the disintegrating device relative to the formation layer orientation to be 50° or greater.

Embodiment 5

The method of any prior embodiment, wherein the change in drilling operational performance is indicative of a change in the formation layer orientation.

Embodiment 6

The method of any prior embodiment, wherein at least one sensor of the one or more sensors is located within the bottomhole assembly.

Embodiment 7

The method of any prior embodiment, further comprising at least one of transmitting the formation layer information to a surface control unit for processing and transmitting an adjusted steering command from the surface control unit the bottomhole assembly.

Embodiment 8

The method of any prior embodiment, further comprising automatically performing the monitoring, detecting, and adjusting with a downhole controller of the bottomhole assembly.

Embodiment 9

The method of any prior embodiment, further comprising moving the drill string away from bottomhole prior to adjusting the steering command.

Embodiment 10

The method of any prior embodiment, wherein the angle of attack is generated by setting a steering force perpendicular to the formation layer orientation.

Embodiment 11

The method of any prior embodiment, further comprising estimating a formation layer orientation based on at least one of the formation layer orientation information, offset well data, and historical data.

Embodiment 12

A system for controlling a drilling operation comprising: a drill string; a bottomhole assembly having a disintegrating device disposed at an end of the drill string, wherein the disintegrating device is used to perform a drilling operation and wherein the bottomhole assembly is configured to drill into a formation based on a steering command; and one or more sensors configured to detect and monitor formation layer orientations and obtain formation layer orientation information indicative of a formation layer orientation; wherein a drilling operational performance of at least one of the disintegrating device and the bottomhole assembly is monitored by one or more associated sensors to detect a change in the drilling operational performance, and wherein a steering command is adjusted to set an angle of attack of the disintegrating device relative to the detected formation layer orientation when a change in the drilling operational performance is detected.

Embodiment 13

The system of any prior embodiment, wherein the drilling operational performance comprises at least one of rate of penetration, revolutions per minute, downhole pressure, drilling vibration, torque, weight-on-bit, and bending moment.

Embodiment 14

The system of any prior embodiment, wherein the one or more sensors for monitoring formation layer orientations comprise one or more of acoustic sensors, ultrasonic sensors, resistivity sensors, gamma ray sensors, density sensors, radiation sensors, or dipmeters.

Embodiment 15

The system of any prior embodiment, wherein the steering command is adjusted to have an angle of attack of the disintegrating device to the formation change to be 50° or greater.

Embodiment 16

The system of any prior embodiment, wherein the angle of attack is generated by setting a steering force perpendicular to the formation layer orientation.

Embodiment 17

The system of any prior embodiment, wherein at least one sensor of the one or more sensors for monitoring formation layer orientations is located within the bottomhole assembly.

Embodiment 18

The system of any prior embodiment, wherein the bottomhole assembly further comprises at least one of a transmitter to transmit the formation layer information to a surface control unit for processing and a receiver for receiving an adjusted steering command from the surface control unit.

Embodiment 19

The system of any prior embodiment, wherein the bottomhole assembly is configured to perform the monitoring, detecting, and adjusting automatically.

Embodiment 20

The system of any prior embodiment, wherein the bottomhole assembly comprises an imaging unit, a measurement-while-drilling unit, and a steering unit.

Embodiment 21

A method for controlling a subsurface drilling operation comprising: performing the subsurface drilling operation using a bottomhole assembly having a disintegrating device; detecting, with a sensor, a formation layer orientation; approaching, with the disintegrating device, a rock layer; and generating a steering command to change an angle of attack of the disintegrating device relative to the rock layer based on the detected formation layer orientation.

Embodiment 22

The method of any prior embodiment, further comprising detecting, with a drilling operational performance sensor, a change in a drilling operational performance, the drilling operational performance comprising at least one of rate of penetration, revolutions per minute, downhole pressure, drilling vibration, torque, weight-on-bit, and bending moment, wherein the change in the drilling operational performance indicates the approaching of the rock layer with the disintegrating device.

Embodiment 23

The method of any prior embodiment, wherein the sensor comprises one or more of acoustic sensors, ultrasonic sensors, resistivity sensors, gamma ray sensors, density sensors, radiation sensors, dipmeters, and image sensors.

Embodiment 24

The method of any prior embodiment, wherein the angle of attack is changed to be 50° or greater relative to the rock layer orientation based on the detected formation layer orientation.

Embodiment 25

The method of any prior embodiment, wherein the rock layer is a stringer.

Embodiment 26

The method of any prior embodiment, wherein the sensor is located within the bottomhole assembly.

Embodiment 27

The method of any prior embodiment, wherein changing the angle of attack comprises increasing the angle of attack and decreasing the angle of attack prior to increasing the angle of attack.

Embodiment 28

The method of any prior embodiment, further comprising drilling a sidetrack in response to approaching the rock layer.

Embodiment 29

The method of any prior embodiment, wherein detecting the formation layer orientation comprises detecting the formation layer orientation at a first location and further comprising estimating the formation layer orientation at a second location, using a processor, based on at least one of the formation layer orientation at the first location, offset well data, and historical data.

Embodiment 30

The method of any prior embodiment, wherein the second location is at the disintegrating device or ahead of the disintegrating device.

Embodiment 31

A system for controlling a subsurface drilling operation comprising: a bottomhole assembly having a steering unit and a disintegrating device, wherein the disintegrating device is configured to approach a rock layer; one or more sensors configured to detect a formation layer orientation; and a communication device configured to communicate a steering command to the steering unit, the steering command configured to adjust an angle of attack of the disintegrating device relative to the rock layer based on the detected formation layer orientation.

Embodiment 32

The system of any prior embodiment, further comprising a drilling operation performance sensor configured to detect a change in drilling operational performance of the bottomhole assembly, wherein the drilling operational performance comprises at least one of rate of penetration, revolutions per minute, downhole pressure, drilling vibration, torque, weight-on-bit, and bending moment, and wherein the change in the drilling operational performance indicates the approaching of the rock layer with the disintegrating device.

Embodiment 33

The system of any prior embodiment, wherein the one or more sensors comprise one or more of acoustic sensors, ultrasonic sensors, resistivity sensors, gamma ray sensors, density sensors, radiation sensors, dipmeters, and image sensors.

Embodiment 34

The system of any prior embodiment, wherein the steering command is configured to adjust an angle of attack of the disintegrating device relative to the rock layer to be 50° or greater based on the detected formation layer orientation.

Embodiment 35

The system of any prior embodiment, wherein the rock layer is a stringer.

Embodiment 36

The system of any prior embodiment, wherein at least one sensor of the one or more sensors is located within the bottomhole assembly.

Embodiment 37

The system of any prior embodiment, wherein the steering command is configured to increase the angle of attack and to decrease the angle of attack prior to increasing the angle of attack.

Embodiment 38

The system of any prior embodiment, wherein the bottomhole assembly is configured to drill a sidetrack in response to the steering command.

Embodiment 39

The system of any prior embodiment, wherein the one or more sensors are configured to detect the formation layer orientation at a first location, the system further comprising a processor configured to estimate the formation layer orientation at a second location based on at least one of the formation layer orientation at the first location, offset well data, and historical data.

Embodiment 40

The system of any prior embodiment, wherein the second location is at the disintegrating device or ahead of the disintegrating device.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for controlling a subsurface drilling operation comprising:
   performing the subsurface drilling operation using a bottomhole assembly having a disintegrating device;
   detecting, with a sensor, a formation layer orientation;
   approaching, with the disintegrating device, a rock layer according to a planned drilling trajectory with a planned angle of attack;
   determining that the rock layer is being approached;
   adjusting, upon determining that the rock layer is being approached, the planned drilling trajectory to generate an adjusted drilling trajectory, the adjusted drilling trajectory comprising an updated angle of attack, wherein the updated angle of attack is larger than the planned angle of attack; and
   drilling, with the disintegrating device, into the rock layer according to the adjusted drilling trajectory,
   wherein the updated angle of attack is changed to generate the adjusted drilling trajectory and changing of the updated angle of attack comprises first decreasing the updated angle of attack to an angle less than the planned angle of attack, drilling at the decreased updated angle of attack, and then increasing the updated angle of attack to drill into the rock layer at the increased updated angle of attack larger than the planned angle of attack.

2. The method of claim 1, further comprising detecting, with a drilling operation performance sensor, a change in a drilling operational performance, the drilling operational performance comprising at least one of rate of penetration, revolutions per minute, downhole pressure, drilling vibration, torque, weight-on-bit, and bending moment, wherein the change in the drilling operational performance indicates the approaching of the rock layer with the disintegrating device.

3. The method of claim 1, wherein the sensor comprises one or more of acoustic sensors, ultrasonic sensors, resistivity sensors, gamma ray sensors, density sensors, radiation sensors, dipmeters, and image sensors.

4. The method of claim 1, wherein the updated angle of attack is 50° or greater relative to the rock layer based on the detected formation layer orientation.

5. The method of claim 1, wherein the rock layer is a stringer.

6. The method of claim 1, wherein the sensor is located within the bottomhole assembly.

7. The method of claim 1, further comprising drilling a sidetrack in response to approaching the rock layer.

8. The method of claim 1, wherein detecting the formation layer orientation comprises detecting the formation layer orientation at a first location and further comprising estimating the formation layer orientation at a second location, using a processor, based on at least one of the formation layer orientation at the first location, offset well data, and historical data.

9. The method of claim 8, wherein the second location is at the disintegrating device or ahead of the disintegrating device.

10. The method of claim 1, further comprising, prior to decreasing the updated angle of attack, pulling the disintegrating device uphole away from the rock layer.

11. The method of claim 1, further comprising:
    after drilling at the decreased updated angle of attack, drilling a section that runs parallel to the planned drilling trajectory, and then increasing the updated angle of attack to the increased updated angle of attack.

12. A system for controlling a subsurface drilling operation comprising:
    a bottomhole assembly having a steering unit and a disintegrating device, wherein the disintegrating device is configured to approach a rock layer according to a planned drilling trajectory with a planned angle of attack;
    one or more sensors configured to detect a formation layer orientation; and
    a processor configured to determine that the rock layer is being approached and adjusting the planned drilling trajectory to generate an adjusted drilling trajectory, the adjusted drilling trajectory comprising an updated angle of attack, wherein the updated angle of attack is larger than the planned angle of attack of the planned drilling trajectory;
    wherein the disintegrating device is controlled and operated in accordance with the adjusted drilling trajectory,
    wherein the updated angle of attack is changed to generate the adjusted drilling trajectory and changing of the updated angle of attack comprises first decreasing the updated angle of attack to an angle less than the planned angle of attack, drilling at the decreased updated angle of attack, and then increasing the updated angle of attack to drill into the rock layer at the increased updated angle of attack larger than the planned angle of attack.

13. The system of claim 12, further comprising a drilling operation performance sensor configured to detect a change in a drilling operational performance of the bottomhole assembly, wherein the drilling operational performance comprises at least one of rate of penetration, revolutions per minute, downhole pressure, drilling vibration, torque, weight-on-bit, and bending moment, and wherein the change in the drilling operational performance indicates the approaching of the rock layer with the disintegrating device.

14. The system of claim 12, wherein the one or more sensors comprise one or more of acoustic sensors, ultrasonic sensors, resistivity sensors, gamma ray sensors, density sensors, radiation sensors, dipmeters, and image sensors.

15. The system of claim 12, wherein the updated angle of attack is 50° or greater relative to the rock layer based on the detected formation layer orientation.

16. The system of claim 12, wherein the processor is configured to adjust the planned drilling trajectory automatically.

17. The system of claim 12, wherein at least one sensor of the one or more sensors is located within the bottomhole assembly.

18. The system of claim 12, wherein the bottomhole assembly is configured to drill a sidetrack to drill the adjusted drilling trajectory.

19. The system of claim 12, wherein the one or more sensors are configured to detect the formation layer orientation at a first location, the processor further configured to estimate the formation layer orientation at a second location based on at least one of the formation layer orientation at the first location, offset well data, and historical data.

20. The system of claim 19, wherein the second location is at the disintegrating device or ahead of the disintegrating device.

21. A method for controlling a subsurface drilling operation comprising:
   performing the subsurface drilling operation using a bottomhole assembly having a disintegrating device;
   detecting, with a sensor, a formation layer orientation;
   approaching, with the disintegrating device, a rock layer according to a planned drilling trajectory with a planned angle of attack;
   determining that the rock layer is being approached;
   adjusting, upon determining that the rock layer is being approached, the planned drilling trajectory to generate an adjusted drilling trajectory, the adjusted drilling trajectory comprising an updated angle of attack to at least one of minimize wear on the disintegrating device and avoid a deviated well; and
   drilling, with the disintegrating device, into the rock layer according to the adjusted drilling trajectory,
   wherein the updated angle of attack is changed to generate the adjusted drilling trajectory and changing of the updated angle of attack comprises first decreasing the updated angle of attack to an angle less than the planned angle of attack, drilling at the decreased updated angle of attack, and then increasing the updated angle of attack to drill into the rock layer at the increased updated angle of attack.

* * * * *